(12) United States Patent
Foerster et al.

(10) Patent No.: US 9,798,612 B1
(45) Date of Patent: Oct. 24, 2017

(54) ARTIFACT CORRECTION USING NEURAL NETWORKS

(71) Applicant: Google Inc., Mountain View, CA (US)

(72) Inventors: Jakob Nicolaus Foerster, Oxford (GB); Alexander Mordvintsev, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/996,035

(22) Filed: Jan. 14, 2016

(51) Int. Cl.
```
G06F 11/00    (2006.01)
G06K 9/00     (2006.01)
G06N 3/00     (2006.01)
G06F 11/07    (2006.01)
G06N 3/08     (2006.01)
G06N 3/04     (2006.01)
```

(52) U.S. Cl.
CPC ...... *G06F 11/0793* (2013.01); *G06F 11/0706* (2013.01); *G06F 11/079* (2013.01); *G06F 11/0751* (2013.01); *G06N 3/04* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 8,494,282 B2 * | 7/2013 | Gaubatz | G06K 7/146 235/462.32 |
| 8,768,089 B2 * | 7/2014 | Zhang | H04N 19/176 382/261 |
| 9,373,160 B2 * | 6/2016 | Fergus | G06T 5/005 |
| 9,501,724 B1 * | 11/2016 | Misra | G06K 9/66 |
| 9,542,626 B2 * | 1/2017 | Martinson | G06K 9/6256 |

OTHER PUBLICATIONS

Ling Guan, "Model-based neural evaluation and iterative gradient optimization in image restoration and statistical filtering", J. Electron. Imaging. 4(4), 407-412 (Oct. 1, 1995). ; http://dx.doi.org/10.1117/12.217268.*

Fillali Ferhat, Maza Sofiane and Graini Abid. Article: Image Restoration using a Network of Reduced and Regularized Neural Networks. International Journal of Computer Applications 54(8):1-6, Sep. 2012.*

(Continued)

*Primary Examiner* — Justin R Knapp
(74) *Attorney, Agent, or Firm* — Fish & Richardson P.C.

(57) ABSTRACT

Methods, systems, and apparatus, including computer programs encoded on computer storage media, for correcting a corrupted data sample using a trained deep neural network, the method including obtaining a feature representation of a corrupted data sample; and modifying the feature representation of the corrupted data sample to generate a feature representation of a corrected data sample by iteratively processing a current version of the feature representation of the corrupted data sample using the trained deep neural network to generate a current corruption score for the current version of the feature representation of the corrupted data sample and generating a less-corrupted version of the feature representation by performing an iteration of gradient descent against the current version of the feature representation of the corrupted data sample to reduce the current corruption score.

16 Claims, 3 Drawing Sheets

(56) References Cited

OTHER PUBLICATIONS

Burger et al., "Image denoising: Can plain Neural Networks compete with BM3D?" 2012 IEEE Conference on Computer Vision and Pattern Recognition (CVPR), pp. 4321-4328, Jun. 2012.
De Nunzio et al., "Neural networks for artifact reduction and vowel speech imagery classification in EEG data," Neuropsychological Trends, Nov. 2013, 2 pages.
Eigen et al., "Restoring an Image Taken Through a Window Covered with Dirt or Rain," ICCV '13 Proceedings of the 2013 IEEE International Conference on Computer Vision, pp. 633-640, 2013.
Ksiezyk et al., "Neural Networks with Wavelet Preprocessing in EEG Artifact Recognition," Abstract of Medicon Conference, pp. 23-95, 1998.
Torres et al., "A Neural Network for Nonuniformity and Ghosting Correction of Infrared Image Sequences," Image Analysis and Recognition. Springer Berlin Heidelberg, 2005, pp. 1208-1216.
Uyttendaele et al., "Eliminating Ghosting and Exposure Artifacts in Image Mosaics," Proceedings of the 2001 IEEE Computer Society Conference on Computer Vision and Pattern Recognition, 2001, CVPR 2001, vol. 2, pp. II-509-II-516.

\* cited by examiner

ARTIFACT CORRECTION USING NEURAL NETWORKS

BACKGROUND

This specification relates to neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters. Neural networks may be trained on classification tasks and used to classify neural network inputs into a number of categories.

SUMMARY

A system can obtain a corrupted data sample, i.e., a data sample that contains an artifact, such as an artificially generated panoramic image that contains visible edges at the stitching points between the different images used to generate the panoramic image. The system can process the corrupted data sample using a neural network that is trained to predict whether a given data sample is corrupted or not, e.g., a neural network that is trained to predict whether an image is a single shot image or a panoramic image, and reduce the corruptness of the data sample, i.e., correct the artifact, by performing backpropagation on the corrupted data sample.

In general, one innovative aspect of the subject matter described in this specification can be embodied in methods for correcting a corrupted data sample using a trained deep neural network, wherein the trained deep neural network has been trained to receive an input feature representation of an input data sample and to process the input feature representation to generate a corruption score for the corrupted data sample that represents a likelihood that the input data sample is corrupted, the method comprising: obtaining a feature representation of a corrupted data sample; and modifying the feature representation of the corrupted data sample to generate a feature representation of a corrected data sample by iteratively performing the following: processing a current version of the feature representation of the corrupted data sample using the trained deep neural network to generate a current corruption score for the current version of the feature representation of the corrupted data sample; and generating a less-corrupted version of the feature representation by performing an iteration of gradient descent against the current version of the feature representation of the corrupted data sample to reduce the current corruption score.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the feature representation of the corrupted data sample is a point in a multi-dimensional feature space.

In other implementations performing an iteration of gradient decent against the current version of the feature representation of the corrupted data sample to reduce the current corruption score comprises adjusting the position of the point in the multi-dimensional feature space to reduce the corruption score.

In some implementations performing an iteration of gradient decent against the current version of the feature representation of the corrupted data sample to reduce the current corruption score comprises adjusting the position of the point in the multi-dimensional feature space within a predetermined prior in the multi-dimensional feature space.

In some cases the prior in the multi-dimensional feature space ensures that the statistics of the adjusted position of the point in the multi-dimensional feature space are similar to naturally observed statistics of uncorrupted data samples.

In other cases modifying the feature representation of the corrupted data sample to generate a feature representation of a corrected data sample further comprises performing median smoothing after each iteration of gradient descent.

In some implementations the corrupted data sample is an image.

In further implementations the image is corrupted because a merge-line is visible in the image.

In some implementations the corrupted data sample is a sub-image of a larger, high resolution image.

In further implementations the method further comprises, for each other sub-image of the larger, high resolution image: obtaining a feature representation of the other sub-image; and modifying the feature representation of the other sub-image to generate a feature representation of a corrected other sub-image.

In some cases the method further comprises using the generated feature representations of the corrected sub-images to generate a feature representation of a corrected data sample that represents the larger, high resolution image.

In some implementations the corrupted data sample is a sound.

In further implementations the sound is corrupted because a transition between audio sequences is audible in the sound.

In some cases the trained deep neural network has been trained to receive an input feature representation of an input data sample and to process the input feature representation to generate multiple different corruption scores for the corrupted data sample corresponding to different types of corruption.

In other cases the method further comprises iteratively correcting the different types of corruption corresponding to the multiple different corruption scores.

The subject matter described in this specification can be implemented in particular embodiments so as to realize one or more of the following advantages.

A system implementing artifact correction using neural networks may reduce the corruption and improve the quality of data samples, including data samples that have been artificially generated through the merging and modifying of original content. For example, detectable artifacts such as visible edges at stitching points of panoramic images or imperfections in synthesized speech may be corrected. The system implementing artifact correction using neural networks may be used to correct errors and artifacts in a variety of domains, for example any domain in which a large number of corrupted and uncorrupted data samples exists. In addition, the system may correct errors and artifacts in data samples without prior knowledge of the type of artifact that is to be corrected or where the error or artifact occurs in the data sample.

A system implementing artifact corrections using neural networks may be used to correct errors and artifacts in data samples without requiring error-specific logic. For example, in the case of correcting errors and artifacts in data samples that are images, the system implementing artifact corrections using neural networks may be used to correct errors in image stitching that are based on a variety of factors, such as scaling, blurring or alignment. The system implementing artifact corrections using neural networks may be used to fix different types of errors on a one-by-one basis.

A system implementing artifact corrections using neural networks may be used to produce corrected data samples that retain the natural properties and naturally observed statistics of the data samples, thus reducing the corruptness of data samples whilst maintaining their quality.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
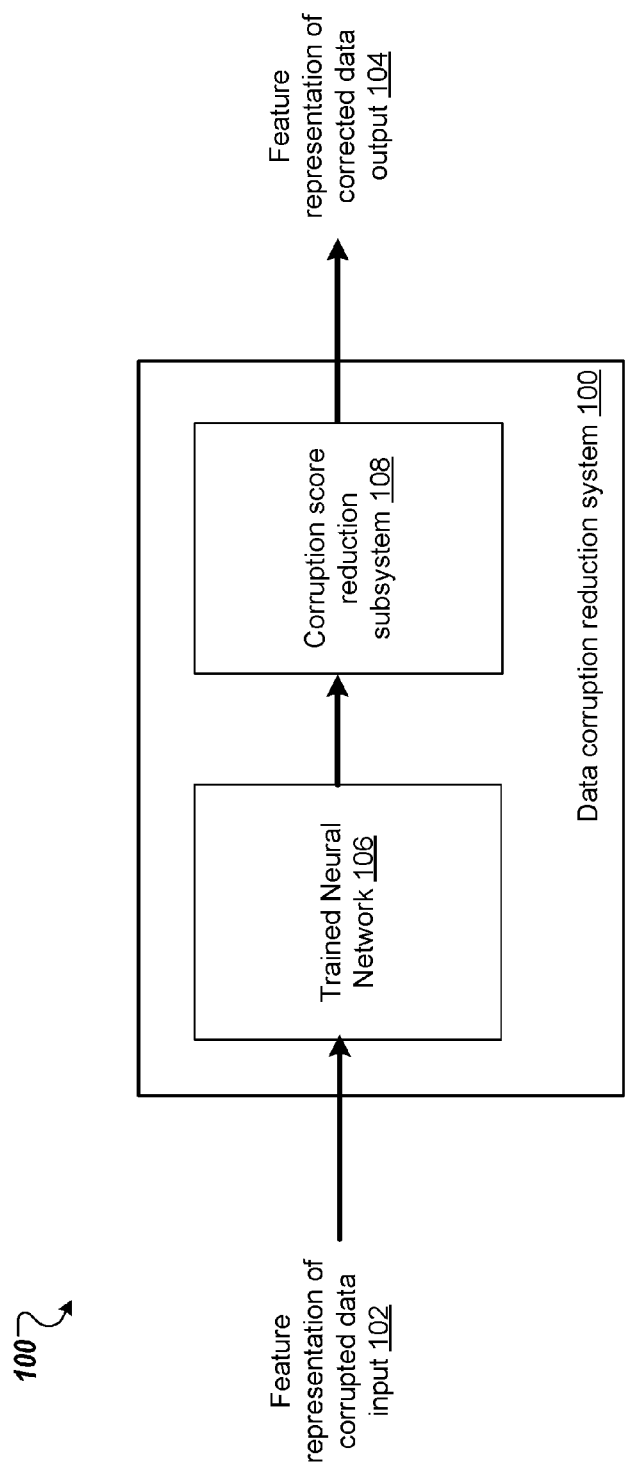
FIG. 1 shows an example of a data corruption reduction system.

FIG. 1 shows an example data corruption reduction system 100. The data corruption reduction system 100 is an example of a system implemented as computer programs on one or more computers in one or more locations, in which the systems, components, and techniques described below can be implemented.

The data corruption reduction system 100 is a system that obtains a feature representation of a corrupted data input 102 and generates as an output a feature representation of a corrected data output 104.

The data corruption reduction system 100 includes a trained neural network 106. The trained neural network 106 is a deep neural network and includes multiple neural network layers. One or more of the neural network layers may be hidden neural network layers. Each of the layers of the deep neural network is configured to receive a respective layer input, e.g., an output generated by another layer, an input to the neural network, or both, and process the layer input to generate a respective layer output, i.e., a layer activation, from the input.

The trained neural network 106 receives an input feature representation of an input data sample, e.g., feature representation of corrupted data input 102, and processes the feature representation of the input data sample through the multiple neural network layers to generate a corruption score for the input data sample that represents a likelihood that the input data sample is corrupted. A feature representation of an input data sample is a point, e.g., an n-dimensional vector of numerical feature values, in a multi-dimensional feature space that represents a data object, e.g., an image or sound.

The trained neural network 106 has been trained, e.g., using gradient descent or other conventional neural network training technique, to generate a corruption score for a data input using a training dataset that includes corrupted data samples and uncorrupted samples. For example, the trained neural network 106 may have been trained to generate a corruption score for an input image and the training dataset may have included a mix of "single shot" images and "panorama" images which are otherwise equivalent. In this example, the corruption score represents the likelihood that the input image contains visible edges at stitching points between different images. The trained neural network 106 may be trained to generate multiple different corruption scores for a data input that correspond to multiple different types of corruption that may be present in the data input.

The data corruption reduction system 100 includes a corruption score reduction subsystem 108. The corruption score reduction subsystem 108 reduces the corruption score for the data input corresponding to the feature representation of the corrupted data input obtained by the data corruption reduction system 100. To reduce the corruption score, the corruption score reduction subsystem 108 performs multiple iterations of gradient descent against the feature representation of the corrupted data input 102 by adjusting the position of the feature representation of the corrupted data input 102 in the feature space to reduce the corruption score, i.e., by optimizing the position of the feature representation of the corrupted data input 102 in the feature space. The corruption reduction subsystem 108 generates as output a feature representation of a data sample corresponding to the adjusted position of the feature representation of the corrupted data input 102 in the feature space.

In some implementations the corruption scores may represent likelihoods that data inputs are not corrupt, e.g., a likelihood that data inputs are correct. In these implementations a lower score may indicate that a data input is more corrupt than a higher score and the system may adjust the position of a feature representation of a data input to increase rather than reduce the corruption score.

The corruption score reduction subsystem 108 may optimize the position of the feature representation of the corrupted data input using constrained optimization techniques. For example, the corruption score reduction subsystem 108 may adjust the position of the feature representation of the corrupted data input 102 within a predetermined prior in the feature space, e.g., a prior that represents feature representations of data samples with naturally observed statistics.

The data corruption reduction system 100 generates as output a feature representation of a corrected data output, e.g., feature representation of corrected data output 104. Generating a feature representation of a corrected data sample is described in more detail below with reference to FIG. 2.

Figure 2:
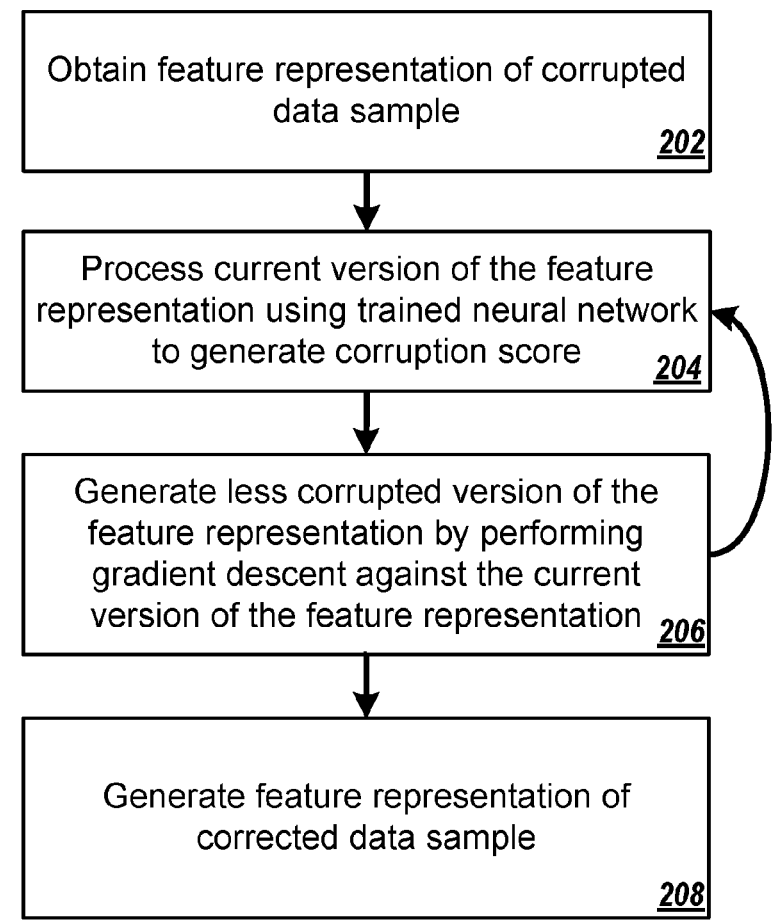
FIG. 2 is a flow diagram of an example process for generating a feature representation of a corrected data sample.

FIG. 2 is a flow diagram of an example process 200 for generating a feature representation of a corrected data sample. For convenience, the process 200 will be described as being performed by a system of one or more computers located in one or more locations. For example, a data corruption reduction system, e.g., the data corruption reduction system 100 of FIG. 1, appropriately programmed in accordance with this specification, can perform the process 200.

The system obtains a feature representation of a corrupted data sample, e.g., the feature representation of corrupted data sample 102 of FIG. 1 (step 202). The feature representation of the corrupted data sample is a point in a multi-dimensional feature space. The point may be an n-dimensional vector of numerical feature values that represent an object.

In some implementations the corrupted data sample is an image. In such a case the feature values may correspond to the pixels of the image. The image may be corrupted because a merge-line is visible in the image, e.g., the image may be an artificially generated panoramic image that has visible edges at the stitching points between the different images used to generate the panoramic image.

In some implementations the corrupted data sample is a sound. In such a case the feature values may correspond to amplitudes in a temporal domain. The sound may be corrupted because a transition between audio sequences is audible in the sound, e.g., the sound may be generated speech that has audible stitches between different synthesized sound samples used to generate the speech.

The system processes a current version of the feature representation of the corrupted data sample using a trained deep neural network to generate a current corruption score for the current version of the feature representation of the corrupted data sample (step 204). The trained neural network is a deep neural network that has been trained to receive an input feature representation of an input data sample and to process the input feature representation to generate a corruption score for the corrupted data sample that represents a likelihood that the input data sample is corrupted, e.g., trained neural network 106 of FIG. 1. The corruption score for the feature representation of the corrupted data sample represents a probability that the feature representation is corrupted.

The system generates a less-corrupted version of the feature representation by performing an iteration of gradient descent against the current version of the feature representation of the corrupted data sample to reduce the current corruption score (step 206).

In some implementations, the system performs an iteration of gradient decent against the current version of the feature representation of the corrupted data sample to reduce the current corruption score by adjusting the position of the respective point in the multi-dimensional feature space to reduce the corruption score, i.e., the system finds a feature representation that is similar to the current feature representation but has a lower corruption score when processed by the trained deep neural network. For example, the system may define a cost function that represents the corruption score generated by the trained neural network in step 204 above, and minimize the cost function using gradient descent to reduce the probability that the feature representation is corrupted. For example, the data sample may be an image and the point in the multi-dimensional feature space may be a vector of numerical feature values that correspond to the pixels of the image. The system may then perform an iteration of gradient descent against the pixels of the image to reduce the current corruption score. The cost function may be the neural network output itself, or in some examples a log likelihood of the neural network input data sample.

In some implementations the system performs an iteration of gradient descent against the current version of the feature representation of the corrupted data sample to reduce the current corruption score by adjusting the position of the point in the multi-dimensional feature space within a predetermined prior in the multi-dimensional feature space. The prior in the multi-dimensional feature space ensures that the statistics of the adjusted position of the point in the multi-dimensional feature space are similar to naturally observed statistics of uncorrupted data samples, i.e., that the statistics and covariance matrix of the lower layers in the less-corrupted version of the feature representation are similar to naturally observed statistics. The system adjust the position of the point in the multi-dimensional feature space within a predetermined prior in the multi-dimensional feature space by including an additional term to the cost function that is minimized by the gradient descent procedure. The additional term may depend on the similarity of the resulting image to a prior distribution over natural images, i.e., the additional term penalizes the system for selecting a position in feature space that corresponds to a lower corruptions score but is not within the prior. In other implementations the system may perform median smoothing after performing gradient descent.

The system generates a feature representation of a corrected data sample (step 208). For example, the system may iteratively perform steps 204 and 206 to modify the feature representation of the corrupted data sample to generate a feature representation of a data sample that has a corruption score that is below a minimum acceptable threshold.

In some implementations the trained deep neural network described above with reference to step 204 has been trained to receive an input feature representation of an input data sample and to process the input feature representation to generate multiple different corruption scores for the corrupted data sample corresponding to different types of corruption. For example, as described above with reference to step 202, in some implementations the input data sample is an image, e.g., an artificially generated panoramic image. In such a case the trained deep neural network may be trained to generate different corruption scores for the panoramic image that respectively correspond to corruption caused by stitching, ghosting, scaling, exposure or alignment artifacts. The system may then iteratively correct the different types of corruption corresponding to the multiple different corruption scores by performing the above steps 204-208 for each type of corruption. In some implementations the system may use a single neural network to perform corrections for a range of errors present in the dataset. In other implementations multiple neural networks may be used.

Figure 3:
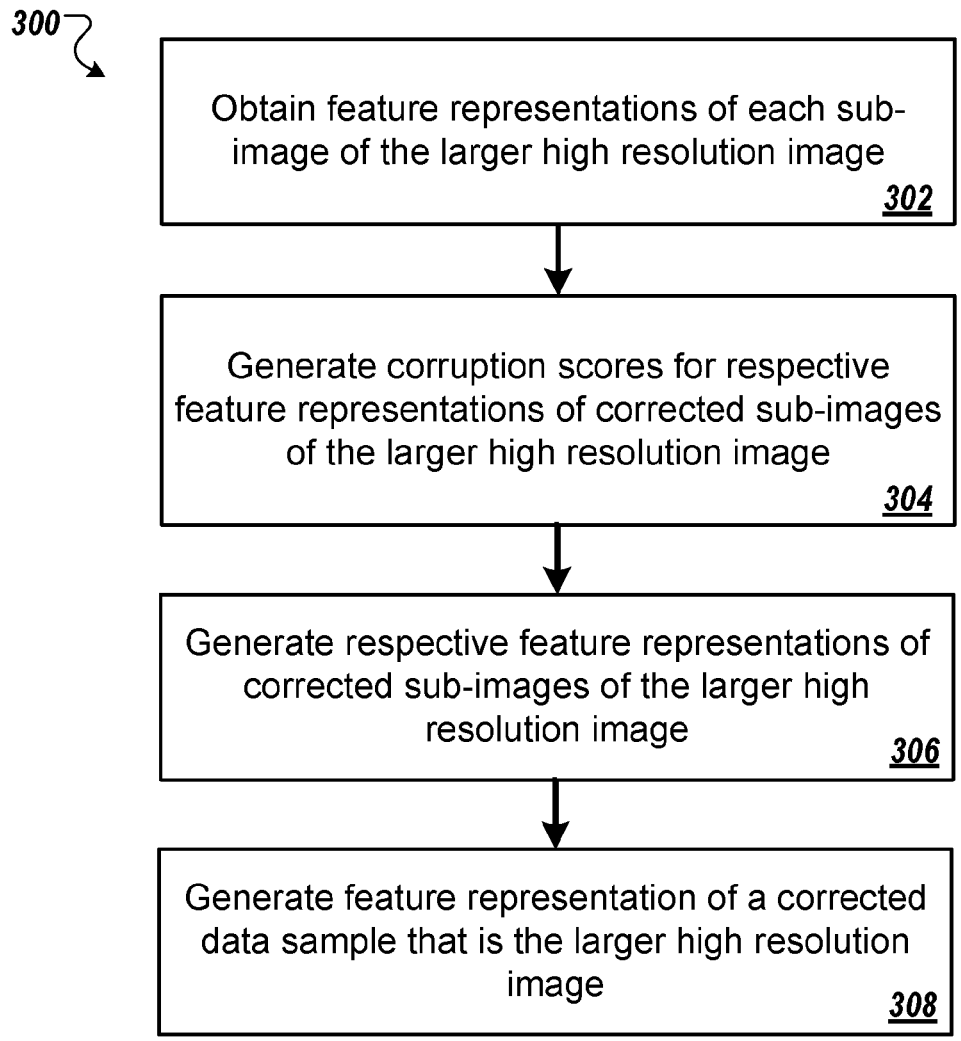
FIG. 3 is a flow diagram of an example process for generating a feature representation of a corrected data sample that represents a high resolution image.

FIG. 3 is a flow diagram of an example process for generating a feature representation of a corrected data sample that represents a high resolution image. For convenience, the process 300 will be described as being performed by a system of one or more computers located in one or more locations. For example, a data corruption reduction system, e.g., the data corruption reduction system 100 of FIG. 1, appropriately programmed in accordance with this specification, can perform the process 300.

The system obtains a respective feature representation of each sub-image of a larger, high resolution image (step 302). For example, the system may obtain a feature representation of a corrupted data sample as described above with reference to step 202 of FIG. 2, where the corrupted data sample is a sub-image of a larger, high resolution image. The system may then obtain a feature representation of each other sub-image of the larger, high resolution image.

The system generates a corresponding corruption score for each obtained respective feature representation of each sub-image of the larger high resolution image (step 304). For example, the system may process each obtained respective feature representation of each sub-image of the larger, higher resolution image using a trained neural network to generate a corresponding corruption score for the obtained respective feature representation, as described above in step 204 of FIG. 2.

The system generates feature representations of corrected sub-images of the larger, high resolution image by modifying any obtained respective feature representations of the sub-images that are corrupted (step 306). For example, the system may determine that one or more of the generated corruptions scores for the obtained respective feature representations are above a predetermined threshold, i.e., that one or more of the sub-images are corrupted. The system may then modify each obtained feature representation of a corrupted sub-image to generate a corresponding feature representation of a corrected sub-image as described with reference to step 206 of FIG. 2.

The system uses the generated feature representations of the corrected sub-images of the larger, high resolution image to generate a feature representation of a corrected data sample that represents the larger, high resolution image (step 308). The system may generate a feature representation of a corrected data sample that represents the larger, high resolution image by combining the feature representations of each corrected sub-image of the larger high resolution image with the feature representations of the remaining sub-images, e.g., the feature representations of sub-images whose corruption scores were below the predetermined threshold described in step 306. For example, the system may combine the feature representations of each corrected sub-image by stacking corresponding vectors of feature values, e.g., using left and right context of adjacent vectors, to create a larger vector of feature values that represents the larger high resolution image.

In some implementations the system may perform process 300 as a sliding window optimization where the system performs steps 302-308 to reduce the corruption score of overlapping sub-images of the larger, high resolution image at a time.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programmings language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., as a result of the user interaction, can be received from the user device at the server.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of correcting a corrupted data sample using a trained deep neural network,
    wherein the trained deep neural network includes a plurality of neural network layers and has been trained to receive a feature representation of an input data sample and to process the feature representation to generate a corruption score for the input data sample that represents a likelihood that the input data sample is corrupted,
    the method comprising:
        obtaining a feature representation of a data sample, wherein the feature representation is a point in a multi-dimensional feature space; and
        modifying the feature representation of the data sample to generate an updated feature representation by initializing a current feature representation to be a copy of the feature representation and then iteratively performing the following operations:
            processing the current feature representation using the trained deep neural network to generate a corruption score for the current feature representation;
            performing an iteration of gradient descent to generate an updated current feature representation that has a reduced corruption score when processed by the trained deep neural network, comprising:
                minimizing, with respect to the current feature representation, a cost function that is a function of the corruption score, comprising adjusting a position of the point in the multi-dimensional feature space to reduce the corruption score; and
        outputting a corrected data sample having the updated feature representation.

2. The method of claim 1, wherein performing an iteration of gradient decent comprises adjusting the position of the point in the multi-dimensional feature space within a predetermined prior in the multi-dimensional feature space.

3. The method of claim 2, wherein the prior in the multi-dimensional feature space ensures that the statistics of the adjusted position of the point in the multi-dimensional feature space are similar to naturally observed statistics of feature representations of uncorrupted data samples.

4. The method of claim 1, further comprising performing median smoothing of the current feature representation after each iteration of gradient descent.

5. The method of claim 1, wherein the data sample is an image.

6. The method of claim 5, wherein the image comprises a visible merge-line.

7. The method of claim 5, wherein the data sample is a sub-image of a larger, high resolution image.

8. The method of claim 7, further comprising, for each other sub-image of the larger, high resolution image:
   obtaining a feature representation of the other sub-image; and
   modifying the feature representation of the other sub-image to generate an updated feature representation the other sub-image.

9. The method of claim 8, further comprising using the generated updated feature representations of the other sub-images to generate a feature representation of a data sample that represents the larger, high resolution image.

10. The method of claim 1, wherein the data sample comprises audio data.

11. The method of claim 10, wherein the audio data comprises an audible transition between audio sequences in the audio data.

12. The method of claim 1, wherein the corruption score is a first corruption score and the trained deep neural network has been trained to generate one or more different second corruption scores corresponding to one or more different types of corruption in the feature representation of the data sample.

13. The method of claim 12, further comprising iteratively correcting each different type of corruption in the feature representation of the data sample.

14. A system comprising one or more computers and one or more storage devices storing instructions that are operable, when executed by the one or more computers, to cause the one or more computers to perform operations for correcting a corrupted data sample using a trained deep neural network,
   wherein the trained deep neural network includes a plurality of neural network layers and has been trained to receive a feature representation of an input data sample and to process the feature representation to generate a corruption score for the input data sample that represents a likelihood that the input data sample is corrupted,
   the operations comprising:
      obtaining a feature representation of a data sample, wherein the feature representation is a point in a multi-dimensional feature space; and
      modifying the feature representation of the data sample to generate an updated feature representation by initializing a current feature representation to be a copy of the feature representation and then iteratively performing the following operations:
         processing the current feature representation using the trained deep neural network to generate a corruption score for the current feature representation;
         performing an iteration of gradient descent to generate an updated current feature representation that has a reduced corruption score when processed by the trained deep neural network, comprising:
            minimizing, with respect to the current feature representation, a cost function that is a function of the corruption score, comprising adjusting a position of the point in the multi-dimensional feature space to reduce the corruption score; and
      outputting a corrected data sample having the updated feature representation.

15. The system of claim 14, wherein performing an iteration of gradient decent comprises adjusting the position of the point in the multi-dimensional feature space within a predetermined prior in the multi-dimensional feature space.

16. A non-transitory computer-readable storage medium comprising instructions stored thereon that are executable by one or more computers and upon such execution cause the one or more computers to perform to perform operations for correcting a data sample using a trained deep neural network,
   wherein the trained deep neural network includes a plurality of neural network layers and has been trained to receive a feature representation of an input data sample and to process the feature representation to generate a corruption score for the input data sample that represents a likelihood that the input data sample is corrupted,
   the operations comprising:
      obtaining a feature representation of a data sample, wherein the feature representation is a point in a multi-dimensional feature space; and
      modifying the feature representation of the data sample to generate an updated feature representation by initializing a current feature representation to be a copy of the feature representation and then iteratively performing the following operations:
         processing the current feature representation using the trained deep neural network to generate a corruption score for the current feature representation;
         performing an iteration of gradient descent to generate an updated current feature representation that has a reduced corruption score when processed by the trained deep neural network, comprising:
            minimizing, with respect to the current feature representation, a cost function that is a function of the corruption score, comprising adjusting a position of the point in the multi-dimensional feature space to reduce the corruption score; and
      outputting a corrected data sample having the updated feature representation.

* * * * *